US009571294B2

(12) United States Patent
Coombs et al.

(10) Patent No.: US 9,571,294 B2
(45) Date of Patent: Feb. 14, 2017

(54) ACKNOWLEDGEMENT MECHANISM (75) Inventors: Alan Coombs, Cambridge (GB); Neil MacMullen, Cambridge (GB); William Webb, Cambridge (GB)

(73) Assignee: NEUL LTD., Cambridge (GB)

( * ) Notice: Subject to any disclaimer, the term of this patent is extended or adjusted under 35 U.S.C. 154(b) by 223 days.

(21) Appl. No.: 14/125,846

(22) PCT Filed: May 2, 2012

(86) PCT No.: PCT/EP2012/057973
§ 371 (c)(1),
(2), (4) Date: Apr. 22, 2014

(87) PCT Pub. No.: WO2012/171711
PCT Pub. Date: Dec. 20, 2012

(65) Prior Publication Data
US 2014/0241230 A1   Aug. 28, 2014

(30) Foreign Application Priority Data

Jun. 13, 2011 (GB) .................................. 1109844.9
Sep. 30, 2011 (GB) .................................. 1116910.9

(51) Int. Cl.
*H04L 12/18* (2006.01)
*H04L 1/16* (2006.01)
*H04L 1/18* (2006.01)
*H04W 4/00* (2009.01)
*H04L 1/00* (2006.01)

(52) U.S. Cl.
CPC ......... *H04L 12/1868* (2013.01); *H04L 1/1607* (2013.01); *H04L 1/1825* (2013.01); *H04L 1/1854* (2013.01); *H04L 1/1861* (2013.01); *H04W 4/00* (2013.01); *H04L 2001/0093* (2013.01)

(58) Field of Classification Search
CPC .. H04L 12/1868; H04L 1/1861; H04L 1/1607; H04L 1/1825; H04L 1/1854; H04L 2001/0093; H04W 4/00
USPC ....... 370/229, 230, 235, 310, 312, 328, 338, 370/351, 389, 395.1, 395.2, 431, 432; 455/403, 422.1, 7, 24
See application file for complete search history.

(56) References Cited

U.S. PATENT DOCUMENTS

| | | | |
|---|---|---|---|
| 7,948,991 B1 | 5/2011 | Hart et al. | |
| 2001/0055356 A1* | 12/2001 | Davies | 375/358 |
| 2005/0250497 A1* | 11/2005 | Ghosh et al. | 455/436 |
| 2007/0174885 A1* | 7/2007 | Hus et al. | 725/105 |
| 2008/0031179 A1* | 2/2008 | Gao et al. | 370/312 |
| 2009/0067358 A1* | 3/2009 | Fischer | 370/312 |
| 2009/0279470 A1 | 11/2009 | Seok | |

(Continued)

FOREIGN PATENT DOCUMENTS

| | | |
|---|---|---|
| EP | 1460791 A2 | 9/2004 |
| WO | 2005004500 A2 | 1/2005 |
| WO | 2009136724 A2 | 11/2009 |

*Primary Examiner* — Obaidul Huq
(74) *Attorney, Agent, or Firm* — Slater Matsil, LLP (57) ABSTRACT A communication device for communicating with a plurality of terminals via a wireless network, the communication device being configured to, when it has a message to transmit to that plurality of terminals: select, from a multiple of available acknowledgement mechanisms, an acknowledgement mechanism for the terminals to use in acknowledging receipt of the message and communicate the selected acknowledgement mechanism to the plurality of terminals.

19 Claims, 6 Drawing Sheets (56) References Cited

U.S. PATENT DOCUMENTS

| | | |
|---|---|---|
| 2010/0002630 A1* | 1/2010 | Park .................... H04L 1/1812 370/328 |
| 2010/0254392 A1 | 10/2010 | Katar et al. |
| 2011/0069653 A1* | 3/2011 | Wang et al. .................. 370/312 |
| 2011/0170499 A1* | 7/2011 | Nayeb Nazar ........ H04L 1/1812 370/329 |

* cited by examiner

ACKNOWLEDGEMENT MECHANISM

The invention relates to acknowledgement mechanisms by means of which a terminal in a wireless communication system can indicate that it has successfully received a message.

A wireless communication system is commonly divided into cells, with each cell covering a particular geographical area. Each cell may comprise a base station arranged to communicate with a plurality of terminals located within the cell. Often it is necessary for the base stations and the terminals to be assured that a message transmitted over the network has been successfully received by its intended recipient so that, if necessary, the message can be retransmitted. This can be straightforwardly achieved by having the recipient transmit an acknowledgment to the transmitting party on successfully receiving the message.

Some examples of different acknowledgement mechanisms can be found in the IEEE 802.11-2007 standard. These mechanisms include sending an acknowledgement, not sending an acknowledgement and sending a block acknowledgement. The particular acknowledgement mechanism to be used is indicated in the message. Broadcast or multicast messages are not acknowledged. Other messages are acknowledged, but those acknowledgements are sent without any regard for the busy/idle state of the network. Finally, to streamline the acknowledgement process, block acknowledgements may be sent that acknowledge multiple bursts in a single acknowledgement message. Not all stations are capable of block acknowledgement, so this mechanism is negotiated in advance between the access point and the station. Some stations are not able to generate the block acknowledgement sufficiently quickly for it to be transmitted in the current transmission opportunity but other, slower stations, may make the decision to delay sending the block acknowledgement until a later transmission opportunity is negotiated with the access point.

It is often necessary to send the same message to multiple terminals within a cell. It is a much more efficient use of resources to "broadcast" this message by transmitting it to a plurality of terminals rather than to transmit the same data individually to each terminal. A broadcast message is transmitted once and multiple terminals listen to the same message. If each of those terminals were to more or less simultaneously transmit an acknowledgement on receiving the broadcast, there is a high probability that those acknowledgements would clash. Having a high volume of acknowledgements transmitted within a short space of time would also interfere with other traffic in the system. Broadcast messages do not typically contain data whose safe delivery is critical. Therefore, a common approach (and the approach that is taken for example in the 802.11 protocol—as mentioned above), is for the terminals not to transmit acknowledgements in response to receiving broadcast messages.

A machine-to-machine network may exploit the capability of machines to tolerate high latency communications to implement a wireless communication network in a part of the electromagnetic spectrum in which the available bandwidth is variable and cannot be guaranteed. An example is so-called white space: a part of the spectrum that is made available for unlicensed or opportunistic access (typically in the UHF TV band and spanning 450 MHz to 800 MHz, depending on the country). In a machine-to-machine network broadcast messages may be efficiently used to communicate important information to a large number of devices in a particular cell. Examples include software updates or delivery of newspapers. In cases such as these it can be important to know whether the message has been received by each terminal—for example in the case of a guaranteed delivery of a newspaper. If there are many terminals within a cell then arranging for the acknowledgements to be delivered an efficient manner without clashing can be problematic.

Therefore, there is a need for an improved acknowledgement mechanism.

According to a first embodiment of the invention, there is provided a communication device for communicating with a plurality of terminals via a wireless network, the communication device being configured to, when it has a message to broadcast to the plurality of terminals, select, from a multiple of acknowledgement mechanisms, an acknowledgement mechanism for the terminals to use in acknowledging receipt of the message and communicate the selected acknowledgement mechanism to the plurality of terminals.

The communication device may be configured to select the acknowledgement mechanism in dependence on a communication condition associated with the wireless network.

The communication device may be configured to select the acknowledgement mechanism in dependence on a communication condition that it is anticipated will be associated with the wireless network if each of the plurality of terminals immediately transmit an acknowledgement on receiving the message.

The communication device may be configured to select the acknowledgement mechanism in dependence on: the number of the plurality of terminals; a bandwidth available to the wireless network; a number of terminals located in a cell associated with the communication device; a loading associated with the wireless network; the message to be transmitted to the plurality of terminals; and/or an urgency associated with the message to be transmitted to the plurality of terminals.

The communication device is configured to select from a multiple of available acknowledgement mechanisms that includes: not transmitting an acknowledgement; transmitting an acknowledgement via a contended-access channel; transmitting an acknowledgement via an allocated-access channel; transmitting an acknowledgement in a transmission slot already allocated to that terminal; and/or allocating a future transmission slot to a terminal for transmitting the acknowledgement.

The communication device may be configured to, if it selects allocating a future transmission slot to a terminal, communicate to the terminal an indication of which transmission slot it should use to transmit its acknowledgement.

The communication device may be configured to include an indication of the selected acknowledgment mechanism in the message.

The communication device may be configured to communicate with the plurality of terminals via a wireless network that operates in white space.

The communication device may be configured to communicate with the plurality of terminals via a wireless network that is configured for machine-to-machine communication.

According to a second embodiment of the invention, there is provided a wireless network comprising a communication device and a plurality of terminals, the communication device being configured to, when it has a message to broadcast to the plurality of terminals via the wireless network, select, from a multiple of acknowledgement mechanisms, an acknowledgement mechanism for the terminals to use in acknowledging receipt of the message and communicate the selected acknowledgement mechanism to the plurality of terminals.

The wireless network may comprise a plurality of communication devices, each associated with a respective cell and configured to communicate with a plurality of terminals located within its cell, and each communication device being configured to select an acknowledgement mechanism in dependence on a communication condition associated with its cell such that one communication device may select a different acknowledgement mechanism from another communication device in respect of the same message.

According to a third embodiment of the invention, there is provided a method for communicating with a plurality of terminals via a wireless network comprising, when communication device has a message to transmit to a plurality of terminals in the network, selecting, from a multiple of acknowledgement mechanisms, an acknowledgement mechanism for the terminals to use in acknowledging receipt of the message and communicating the selected acknowledgement mechanism to the plurality of terminals.

According to a fourth embodiment of the invention, there is provided a method for acknowledging a message transmitted from a communication device to a terminal via a wireless network comprising the communication device indicating to the terminal that a transmission slot already allocated to the terminal should be used to transmit an acknowledgement of the message and the terminal acknowledging receipt of the message by transmitting the acknowledgement in that transmission slot.

According to a fifth embodiment of the invention, there is provided a wireless network comprising a communication device and a terminal for acknowledging a message transmitted to it by the communication device, the communication device being configured to indicate to the terminal that a transmission slot already allocated to the terminal should be used to transmit an acknowledgement of a message and the terminal being configured to acknowledge receipt of the message by transmitting an acknowledgement in that transmission slot.

According to a sixth embodiment of the invention, there is provided a method for acknowledging a message transmitted from a communication device to a terminal via a wireless network comprising the communication device allocating a transmission slot to the terminal for transmitting an acknowledgement of the message and the terminal acknowledging receipt of the message by transmitting the acknowledgement in the allocated slot.

The method may comprise the communication device including with the message an indication of a future message in which the allocated slot will be identified.

The method may comprise the terminal decoding the future message so as to identify the allocated slot.

According to a seventh embodiment of the invention, there is provided a wireless network comprising a communication device and a terminal for acknowledging a message transmitted to it by the communication device, the communication device being configured to allocate a transmission slot to the terminal for transmitting an acknowledgement and the terminal being configured to acknowledge receipt of the message by transmitting the acknowledgement in the allocated transmission slot.

For a better understanding of the present invention, reference is made by way of example to the following drawings, in which.

A communication device may be arranged to communicate with a plurality of terminals via a wireless network. When the communication device has a message to transmit to multiple terminals, such as a broadcast message, it may select a suitable acknowledgement mechanism from a group of multiple acknowledgement mechanisms available to it. This selected mechanism may then be communicated to the terminals, suitably in the message itself, so that they can implement it on successfully receiving the message.

The acknowledgement mechanism may be selected in dependence on a communication condition associated with the network. The communication condition suitably provides an indication of the network's ability to accommodate an increase in traffic as a result of the terminals acknowledging the broadcast message. That indication could be the bandwidth available to the network, the current traffic in the cell, the number of terminals to which the message was broadcast etc.

One or more embodiments of the invention will now be described with specific reference to a wireless network in which the communication device is a base station. This is for the purposes of example only and it should be understood that the flexible acknowledgment mechanism described herein may be implemented in any suitable communication device, irrespective of what particular role that device plays within the network.

Figure 1:
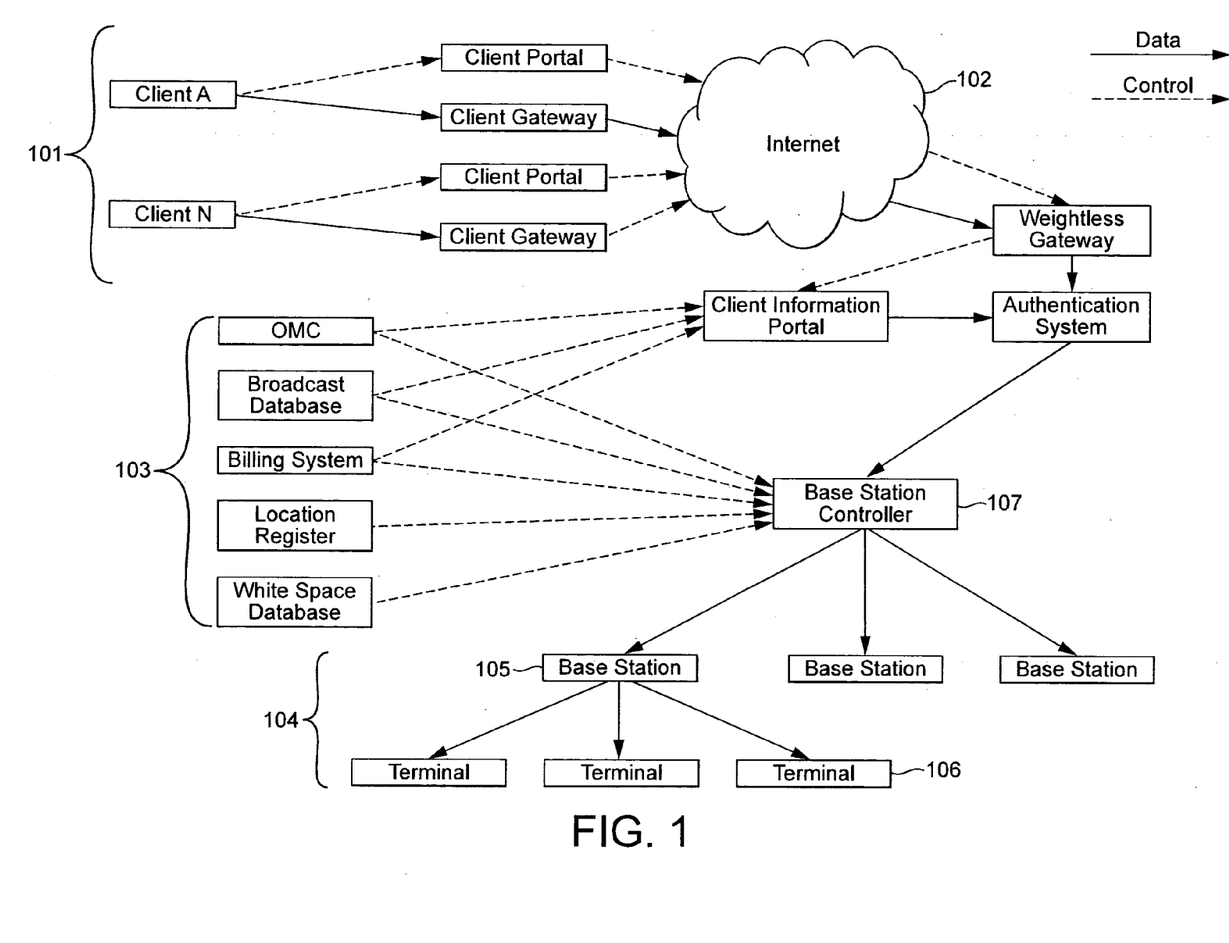
FIG. 1 shows an example of a machine-to-machine network.

An example of a wireless network is shown in FIG. 1. The network, shown generally at 104, comprises one or more base stations 105 that are each capable of communicating wirelessly with a number of terminals 106. Each base station may be arranged to communicate with terminals that are located within a particular geographical area or cell. The base stations transmit to and receive radio signals from the terminals. The terminals are entities embedded or machines or similar that communicate with the base stations. Suitably the wireless network is arranged to operate in a master-slave mode where the base station is the master and the terminals are the slaves.

The base station controller 107 is a device that provides a single point of communication to the base stations and then distributes the information received to other network elements as required. The network may be arranged to communicate with a client-facing portion 101 via the internet 102. In this way a client may provide services to the terminals via the wireless network.

Other logical network elements shown in this example are:
  Core network. This routes traffic information between base stations and client networks.
  Billing system. This records utilisation levels and generates appropriate billing data.
  Authentication system. This holds terminal and base station authentication information.
  Location register. This retains the last known location of the terminals.
  Broadcast register. This retains information on group membership and can be used to store and process acknowledgements to broadcast messages.

Operations and maintenance centre (OMC). This monitors the function of the network and raises alarms when errors are detected. It also manages frequency and code planning, load balancing and other operational aspects of the network.

White spaces database. This provides information on the available white space spectrum.

Client information portal. This allows clients to determine data such as the status of associated terminals, levels of traffic, etc.

In practice, many of the logical network elements may be implemented as databases running software and can be provided on a wide range of platforms. A number of network elements may be physically located within the same platform.

A network such as that shown in FIG. 1 may be used for machine-to-machine communications, i.e. communications that do not involve human interaction. Machine-to-machine communications are well-matched to the limitations of operating in white space, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are able to tolerate the delays and breaks in communication that can result from these varying communication conditions.

It is often necessary to send the same message to multiple terminals within a cell, for example a software update for a domestic appliance or delivery of a newspaper to an electronic reader. It is a much more efficient use of resources to "broadcast" this message rather than to transmit it individually to each terminal. A broadcast message is transmitted once and multiple terminals listen to the same message. In some cases it is important to know whether the message has been received by each terminal—for example in the case of a guaranteed delivery of a newspaper. If there are many terminals within a cell then arranging for the acknowledgements to be delivered an efficient manner without clashing can be problematic. A flexible approach to acknowledgement enables the acknowledgement process to be optimised according to the need of the application and the circumstances of the cell.

Suitably the base station is the communication device that selects the acknowledgement mechanism and communicates it to the terminals. Preferably the base station has a number of different acknowledgement mechanisms available to it from which it can select a mechanism best suited to a particular set of circumstances. Which of the available acknowledgement mechanisms the base station selects may depend on one or more of the following:

The urgency of acknowledgement
The number of terminals in the cell
The current loading on the cell
The available bandwidth in the cell
The number of terminals to which the message is being transmitted
An anticipated loading on the cell if all the terminals to which the message is being transmitted transmit an acknowledgement
A relative importance associated with the message being successfully received The acknowledgement mechanism to be used may be selected in dependence on any of the above factors, either singly or in combination. If the current loading on the cell is heavy (i.e. because demand is high, so that much of the network's resources are already allocated to existing traffic), then an acknowledgement mechanism in which the acknowledgements are either delayed or not transmitted at all may be preferred. If the current loading on the cell is light, then an acknowledgement mechanism that takes advantage of the conditions by having the acknowledgements transmitted relatively quickly via allocated slots or contended access may be preferred. Multiple factors may be considered. If, for example, the current cell loading is relatively heavy but the data comprised in the broadcast message requires guaranteed delivery, the base station may determine that the terminals should be allocated specific slots for transmitting those acknowledgements despite the current cell loading. Similarly, if the current cell loading is relatively light, but the broadcast message is to be transmitted to a large number of terminals so that a high volume of traffic can be expected to result if all the terminals try to transmit their acknowledgment at the same time, the base station may prefer to choose an option that delays the acknowledgments so that they are not all transmitted at once. A high degree of flexibility is thus available to the base station in selecting an acknowledgement mechanism.

Having a flexible approach to acknowledgement may be particularly advantageous in a wireless network operating in white space in which the available bandwidth, because it is not specifically allocated to the network, cannot be guaranteed. In a network operating under such conditions, it may be beneficial to be able to select an acknowledgement mechanism on the basis of the current communication condition of the network (such as the available bandwidth, current loading, number of terminals in the cell etc) rather than just on the type of message to be transmitted. Having a flexible approach to acknowledgement is also particularly well-suited to machine-to-machine communication, since machines are more tolerant of delays in sending acknowledgements and receiving resent failed messages than communications that involve human interaction.

Figure 2:
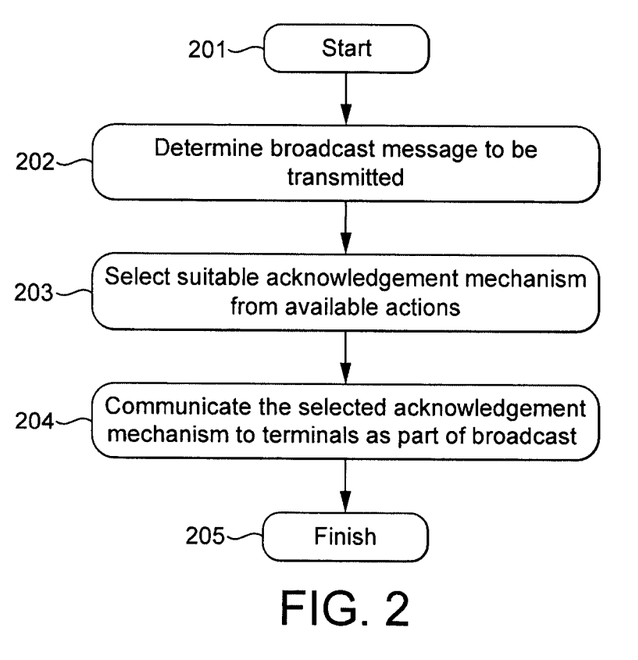
FIG. 2 shows an example of a flexible method for selecting an acknowledgment mechanism.

An overview of a flexible acknowledgement mechanism according to one embodiment of the invention is shown in FIG. 2. The process commences in step 201. In step 202, the base station determines that a broadcast message is to be transmitted. In step 203, the base station selects a suitable acknowledgement mechanism from the available options. In step 204, the base station communicates the selected acknowledgement mechanism each of the terminals. The process terminates in step 205.

Four examples of acknowledgement mechanisms that may be available to the base station are set out below.

No Acknowledgement Needed
Terminals take no further action.
Contended Access (CA) Acknowledgement
Terminals send CA messages to acknowledge receipt using a CA process.
Prior Reservation Acknowledgement
Terminals use their next reserved slot (which has been previously agreed between terminal and base station) to send any acknowledgement. This may be a relatively slow process since reserved slots may be some hours or days in the future.
Defined Reservation Acknowledgement
The base station will provide uplink slots for each terminal registered in the cell for them to provide acknowledgement. In this case a subsequent control message may set out the number of frames over which these acknowledgements will be spread.

Figure 3:
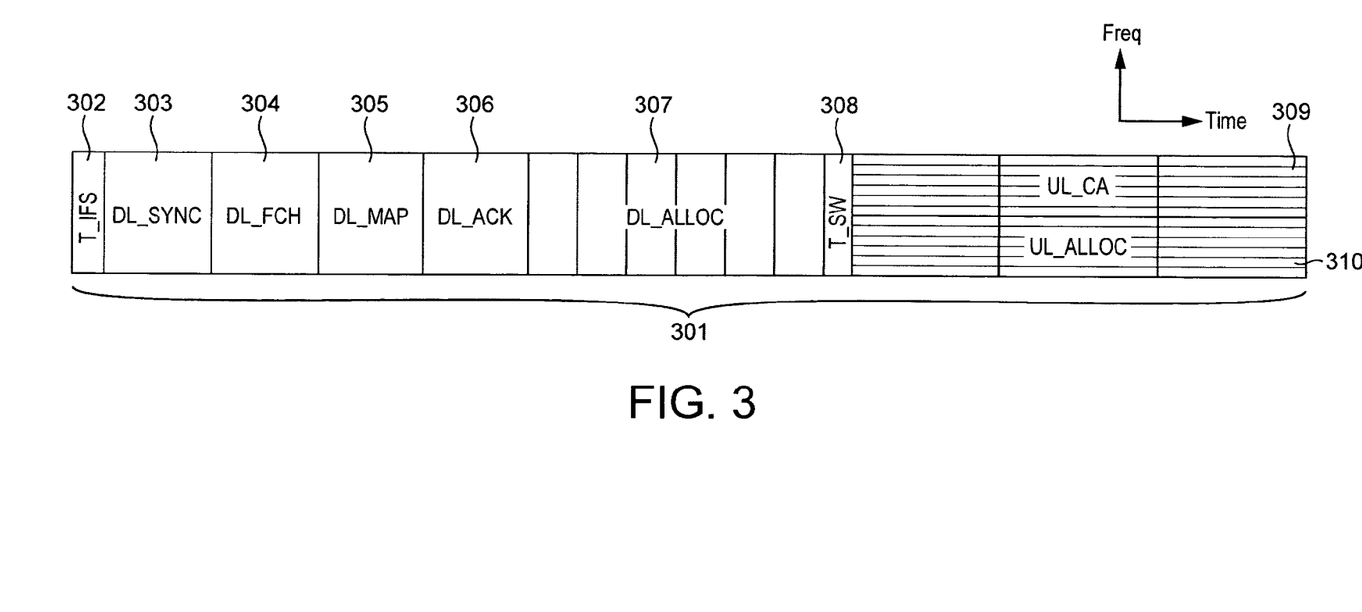
FIG. 3 shows an example of a frame structure.

The network may use medium access control (MAC) to share the same radio resource between multiple terminals. An example of a suitable frame structure is shown in FIG. 3. The frame (shown generally at 301) comprises time to ramp-up to full output power 302 (T_IFS), a synchronisation burst 303 (DL_SYNC), an information field providing the subsequent channel structure 304 (DL_FCH), a map of which information is intended for which terminal 305 (DL_MAP), a field to allow acknowledgement of previous uplink transmissions 306 (DL_ACK) and then the actual information to be sent to terminals 307 (DL_ALLOC). There is then a guard period for ramp-down of the downlink and ramp-up on the uplink 308 (T_SW), followed by channels set aside for uplink contended access 310 (UL_CA) in parallel with the allocated uplink data transmissions 309 (UL_ALLOC).

The base station informs the terminals as to whether there is any information for them in the frame and whether they have an uplink slot reserved for them to transmit information using the DL_MAP. The DL_MAP comprises a table of terminal identities and the number of slots that their information is spread over. The terminals monitoring the frame decode this field to determine whether they need to decode subsequent information and whether they have been allocated a slot in the subsequent uplink section.

To send a message to a group of subscribers, the base station may use a control message known as a broadcast message. This message may specify to the terminals whether or not an acknowledgement is required. A control message may be appended to the end of the broadcast data to define which mode of acknowledgement the terminals are to use.

If the acknowledgement mode is CA acknowledgement, the terminal will send the acknowledgement via contended access. The terminal is able to determine the number of CA slots available in a particular frame by decoding a downlink frame. The terminal then selects a random number between 0 and the number of CA slots and attempts to access the CA slot corresponding to that random number.

CA acknowledgement may be useful in situations, for example, where the acknowledgement is fairly urgent (so that it is preferably that the acknowledgement not be delayed), the number of terminals to which the broadcast message is to be transmitted is relatively low (so that the likelihood of the acknowledgments clashing is not too high) and/or the majority of the allocated access channel is required for other purposes (so that it is preferably not to assign slots to the acknowledgements).

If the acknowledgement mode involves the terminal sending the acknowledgement via allocated access, that acknowledgment may be sent in either a slot already assigned to the terminal or in a newly assigned slot. In a machine-to-machine network there will typically be a very large number of terminals each cell, many of which will have small batteries. The base station is therefore likely to communicate with those terminals relatively infrequently. The next slot assigned to a particular terminal may therefore be some hours or days in the future. For terminals that successfully receive the broadcast data, this is unlikely to pose a problem. However, for terminals that did not receive the broadcast data successfully (and hence do not send an acknowledgement), the delay between the base station sending the broadcast message and its scheduled acknowledgement slot means that the base station will not resend the missed data for some time. For some scenarios, this is unlikely to cause a problem. For example, if the data transmitted in the broadcast message is a software upgrade for a domestic appliance then it is unlikely to cause significant problems to a user if that software upgrade is delayed. However, if the broadcast data is more time critical, for example a daily newspaper being delivered to an electronic reader, then this delay may not be acceptable.

Figure 4:
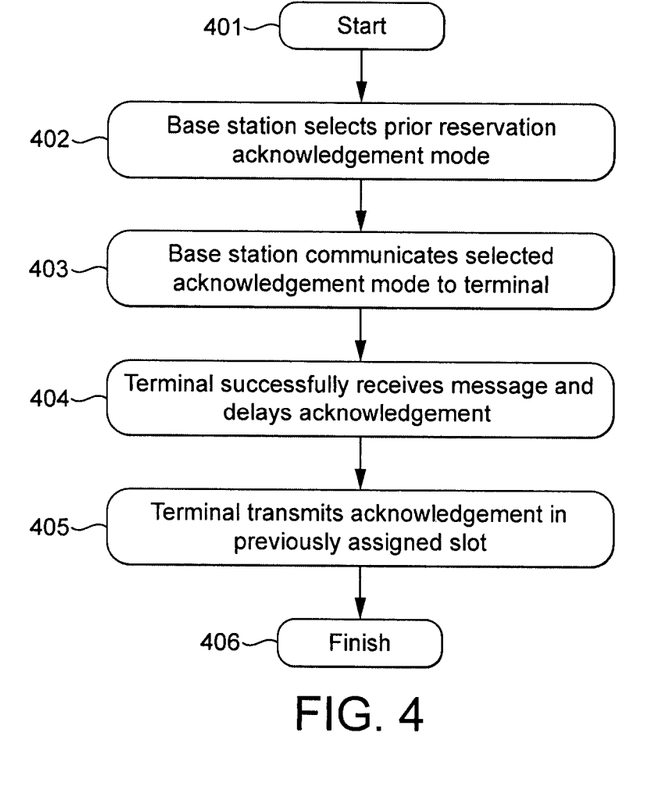
FIG. 4 shows an example of a prior reservation acknowledgement mechanism.

FIG. 4 illustrates an example of a prior reservation acknowledgement mechanism according to one embodiment of the invention. The process commences in step 401. In step 402 the base station selects prior reservation acknowledgement as the acknowledgement mode to be used. The base station communicates the selected acknowledgement mode to the terminal (step 403), either with the message whose receipt is to be acknowledged or separately. In step 404 the terminal successfully receives the message from the base station. However, rather than transmitting its acknowledgement immediately, it waits until its next assigned slot to the base station occurs (step 405). The process terminates in step 406.

An alternative to using a slot that has already been assigned to a terminal is to assign a new slot for the terminal to transmit the acknowledgement. The new assignment may be included in the broadcast message itself or the broadcast message may define future frames that the terminal should listen to for an acknowledgement allocation.

Figure 5:
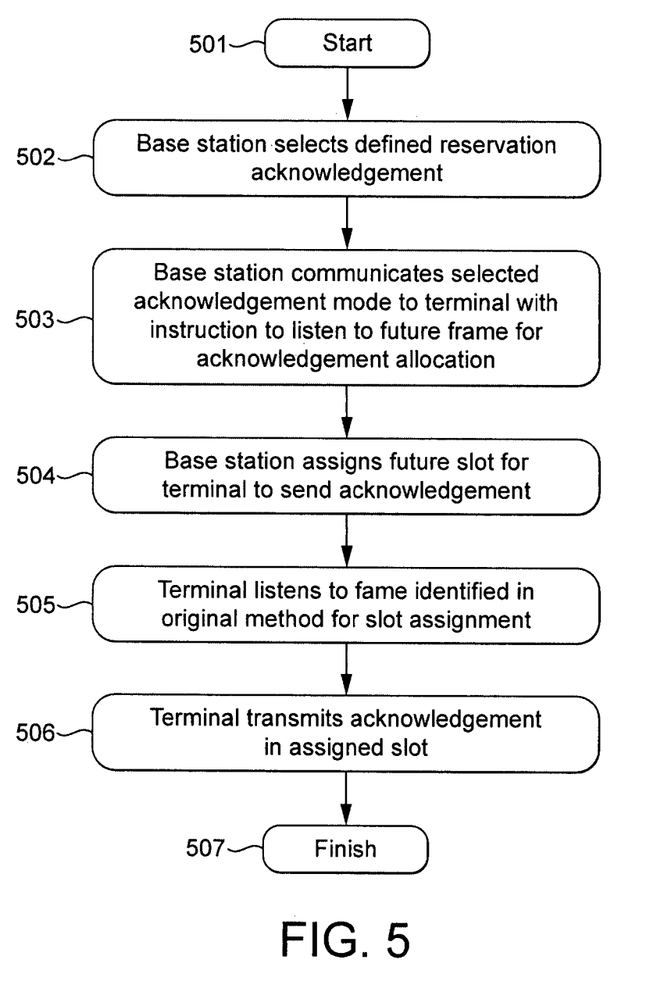
FIG. 5 shows an example of a defined reservation acknowledgement mechanism.

FIG. 5 illustrates an example of a defined reservation acknowledgement mechanism according to one embodiment of the invention. The process commences in step 501. In step 502 the base station selects defined reservation acknowledgement as the acknowledgement mode to be used. The base station communicates the selected acknowledgement mode to the terminal in step 503, along with details of a later frame to which the terminal should listen to receive an identification of the slot that has been assigned to it for transmitting the acknowledgement. In step 504 the base station assigns a slot to the terminal. The terminal listens to the appropriate frame to learn of its slot allocation (step 505) and then transmits its acknowledgement in the designated slot (step 506). The process terminates in step 507.

Assigning slots to the terminals specifically for sending the acknowledgements gives the base station precise control over when it will receive the acknowledgements. This mechanism may be suitable, for example, when the acknowledgement is urgent, when the message is being sent to relatively few terminals and/or when the cell is lightly loaded.

Figure 6:
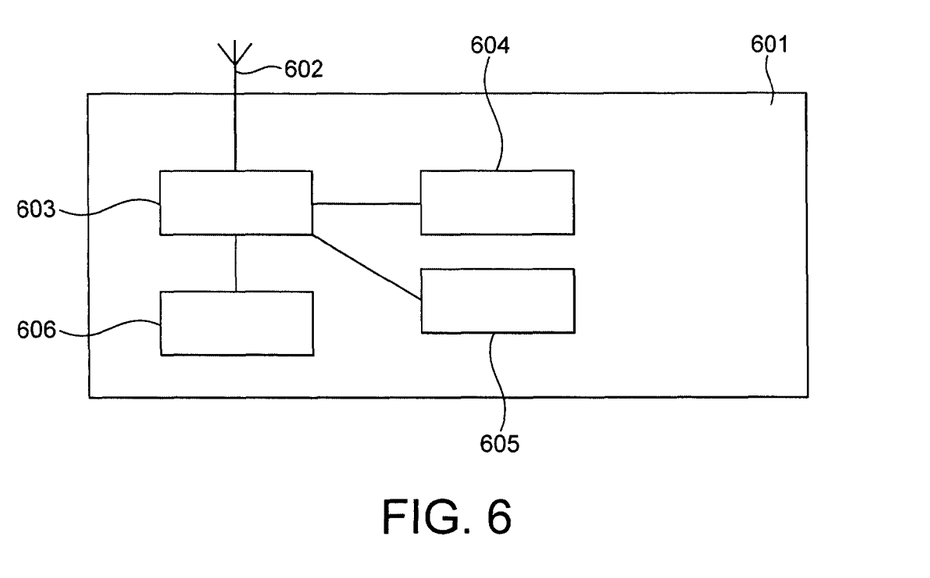
FIG. 6 shows an example of the functional blocks comprised in a communication device.

An example of the functional blocks that may be comprised in a communication device according to one embodiment of the invention are shown in FIG. 6. The communication device, shown generally at 601, comprises a communication unit 603 connected to an antenna 602 for transmitting and receiving messages. The communication device further comprises an analysis unit 605 for analysing the current communication conditions in the network, a selection unit 604 for selecting an appropriate acknowledgement mechanism and an allocation unit 606 for assigning uplink slots to acknowledgements. The communication unit may effectively act as a central controller for the acknowledgement process and may pass information between the other functional blocks.

The apparatus shown in FIG. 6 is shown illustratively as comprising a number of interconnected functional blocks. This is for illustrative purposes and is not intended to define a strict division between different parts of hardware on a chip. In practice, the communication device preferably uses a microprocessor acting under software control for implementing the methods described herein. In some embodiments, the algorithms may be performed wholly or partly in hardware.

A communication device that has a number of different acknowledgements available to it is able to flexibly adapt the acknowledgement mechanism used to the specific communication conditions applying at the time. A message transmitted under one set of communication conditions may be allocated one acknowledgement mechanism while the same message, transmitted under different communications conditions, may be allocated a different acknowledgement mechanism. The advantage of flexibility is also extended to the network as a whole. For example, the same message might be transmitted in multiple cells but with the acknowledgement mechanism applied to that message differing from one cell to another due to the different communication conditions existing in those cells. The term "message" here refers to the data portion or payload of the broadcast, so that two broadcasts can be considered to be the same "message" even though the exact contents of the entire communication by the communication device may differ (e.g. because the identities of the terminals to which the broadcast is addressed are different, or because a different acknowledgement mechanism is specified). Therefore, two broadcasts that comprise the same payload and which are associated with the same urgency, the same delivery guarantees etc may be acknowledged differently in dependence on the time instant and/or location at which they are broadcast.

The communication device is preferably capable of independently assigning the acknowledgment mechanism, i.e. without having to first enter into negotiations with one or more of the terminals. Preferably the communication device assigns the same acknowledgement mechanism to all of the terminals in any given cell to which the message is addressed. However, in some embodiments, the communication device may assign different acknowledgement mechanisms to different terminals.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A communication device for communicating with a plurality of terminals via a wireless network, the communication device being configured to, when it has a message to broadcast to the plurality of terminals:
    determine, in dependence on a bandwidth available to the wireless network and/or a loading associated with the wireless network, an indication of the wireless network's ability to accommodate an increase in traffic if the plurality of terminals acknowledge the broadcast message;
    select, from a plurality of acknowledgement mechanisms and in dependence on the determined indication, an acknowledgement mechanism for the terminals to use in acknowledging receipt of the message with a lower likelihood of acknowledgments clashing, wherein the plurality of acknowledgement mechanisms includes allocating a future transmission slot to a terminal of the plurality of terminals for transmitting an acknowledgement; and
    communicate the selected acknowledgement mechanism to the plurality of terminals, wherein, in response to the communication device selecting allocating a future transmission slot to a first terminal of the plurality of terminals, the communication device is configured to communicate to the first terminal an indication of which transmission slot the first terminal should use to transmit the first terminal's acknowledgement.

2. A communication device as claimed in claim 1, wherein the communication device is configured to select the acknowledgement mechanism in dependence on a communication condition associated with the wireless network.

3. A communication device as claimed in claim 1, wherein the communication device is configured to select the acknowledgement mechanism in dependence on a communication condition that it is anticipated will be associated with the wireless network if each of the plurality of terminals immediately transmit an acknowledgement on receiving the message.

4. A communication device as claimed in claim 1, wherein the communication device is configured to select the acknowledgement mechanism in dependence on the number of the plurality of terminals.

5. A communication device as claimed in claim 1, wherein the communication device is configured to select the acknowledgement mechanism in dependence on a number of terminals located in a cell associated with the communication device.

6. A communication device as claimed in claim 1, wherein the communication device is configured to select the acknowledgment mechanism in dependence on the message to be transmitted to the plurality of terminals in dependence on an urgency associated with the message to be transmitted to the plurality of terminals.

7. A communication device as claimed in claim 1, wherein the plurality of acknowledgement mechanisms includes not transmitting an acknowledgement.

8. A communication device as claimed in claim 1, wherein the plurality of acknowledgement mechanisms includes transmitting an acknowledgement via a contended-access channel.

9. A communication device as claimed in claim 1, wherein the plurality of acknowledgement mechanisms includes transmitting an acknowledgement via an allocated-access channel.

10. A communication device as claimed in claim 1, wherein the plurality of acknowledgement mechanisms includes a terminal transmitting an acknowledgement in a transmission slot already allocated to that terminal.

11. A communication device as claimed in claim 1, wherein the communication device is configured to include an indication of the selected acknowledgment mechanism in the message.

12. A communication device as claimed in claim 1, wherein the communication device is configured to communicate with the plurality of terminals via a wireless network that operates in white space.

13. A wireless network as claimed in claim 12, wherein the wireless network comprises a plurality of communication devices, each associated with a respective cell and configured to communicate with a plurality of terminals located within its cell, and each communication device being configured to select an acknowledgement mechanism in dependence on a communication condition associated with its cell such that one communication device may select a different acknowledgement mechanism from another communication device in respect of the same message.

14. A communication device as claimed in claim 13, wherein the communication device is configured to select the acknowledgement mechanism in dependence on an importance associated with the message being successfully received.

15. A communication device as claimed in claim 1, wherein the communication device is configured to communicate with the plurality of terminals via a wireless network that is configured for machine-to-machine communication.

16. A communication device as claimed in claim 1 for communicating with a plurality of terminals via a wireless network, the communication device being configured to, when it has a message to broadcast to the plurality of terminals that the plurality of terminals should acknowledge receipt of: select, from multiple acknowledgement modes, an acknowledgement mode for the terminals to use in acknowledging receipt of the message, said acknowledgement mode being selected in accordance with an application with which the message is associated; and communicate the selected acknowledgement mode to the plurality of terminals.

17. A wireless network comprising a communication device and a plurality of terminals, the communication device being configured to, when it has a message to broadcast to the plurality of terminals via the wireless network:
  determine, in dependence on a bandwidth available to the wireless network and/or a loading associated with the wireless network, an indication of the wireless network's ability to accommodate an increase in traffic if the plurality of terminals acknowledge the broadcast message;
  select, from a plurality of acknowledgement mechanisms and in dependence on the determined indication, an acknowledgement mechanism for the terminals to use in acknowledging receipt of the message with a lower likelihood of acknowledgments clashing, wherein the plurality of acknowledgement mechanisms includes allocating a future transmission slot to a terminal for transmitting an acknowledgement; and
  communicate the selected acknowledgement mechanism to the plurality of terminals, wherein, in response to the communication device selecting allocating a future transmission slot to a first terminal of the plurality of terminals, the communication device is configured to communicate to the first terminal an indication of which transmission slot the first terminal should use to transmit the first terminal's acknowledgement.

18. A method for communicating with a plurality of terminals via a wireless network comprising, when a communication device has a message to transmit to a plurality of terminals in the network:
  selecting, by the communication device, from a plurality of acknowledgement mechanisms, an acknowledgement mechanism for the terminals to use in acknowledging receipt of the message with a lower likelihood of acknowledgments clashing, wherein the plurality of acknowledgement mechanisms includes allocating a future transmission slot to a terminal for transmitting an acknowledgement; and
  communicating, by the communication device, the selected acknowledgement mechanism to the plurality of terminals, wherein, in response to the communication device selecting allocating a future transmission slot to a first terminal of the plurality of terminals, communicating, by the communication device, to the first terminal an indication of which transmission slot the first terminal should use to transmit the first terminal's acknowledgement.

19. A method according to claim 18 for communicating with a plurality of terminals via a wireless network comprising, when communication device has a message to transmit to a plurality of terminals in the network that the plurality of terminals should acknowledge receipt of: selecting, from multiple acknowledgement modes, an acknowledgement mode for the terminals to use in acknowledging receipt of the message, said acknowledgement mode being selected in accordance with an application with which the message is associated; and communicating the selected acknowledgement mode to the plurality of terminals.

* * * * *